Patented Feb. 12, 1935

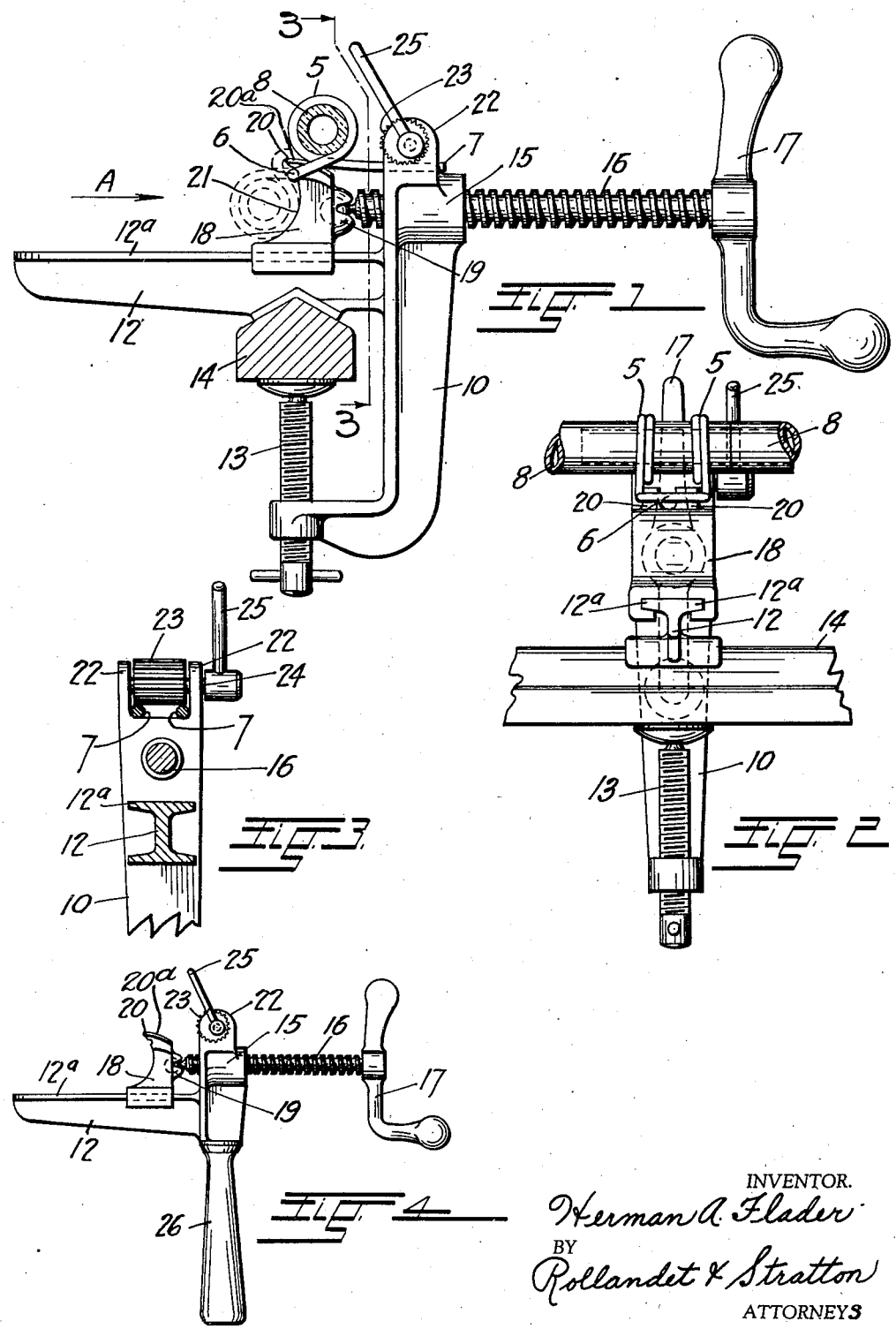

1,990,820

UNITED STATES PATENT OFFICE 1,990,820

CLAMPING TOOL

Herman A. Flader, Denver, Colo.

Application February 24, 1933, Serial No. 658,311

2 Claims. (Cl. 81—9.3)

This invention relates to implements for applying clamps to hose for the usual purpose of securing one hose-section to another or for the attachment of a coupling-member at an end of a hose.

The clamps to which the invention is particularly adapted, consist of a U-shaped piece of wire or other flexible material bent to form hose-encircling loops between a bight member and substantially parallel leg-members.

In the use of an implement of the character of that of the present invention, the loops are tightened around a hose to which the clamp is applied, after which the leg-members are twisted around the bight-member to secure the clamp in place.

It is an object of the invention to produce this result in an effective manner by the use of an efficient and simple mechanism.

An embodiment of the invention has been illustrated in the accompanying drawing in the several views of which like parts are similarly designated, and and in which Figure 1 is an elevation of the implement in its operative position relative to a support, and to the work, both of which are shown in section, Figure 2 is an end view of the device looking in the direction of the arrow A in Figure 1, Figure 3 is a fragmentary section taken on the line 3—3 of Figure 1, and Figure 4 is an elevation of a modification of the implement shown in Figure 1, drawn to a reduced scale.

Referring further to the drawing, the clamp to be applied to the hose, comprises a U-shaped piece of wire, formed to provide the hose-encircling loops 5, the bight-member 6 connecting the loops, and the substantially parallel leg-members 7 projecting oppositely from the same. This clamp is applied to the hose 8, as shown in the drawing, and an implement according to the present invention is employed to tighten the loops around the hose by drawing the leg-members and the bight-member of the clamp in opposite directions. Subsequently the leg-members are twisted around the bight-member by movement of the hose, while the clamp is held in its tightened position by the implement.

With this purpose in view, the implement, as shown in Figures 1 to 3, inclusive, comprises a body-part 10, a guide-member 12 projecting laterally thereof, and a screw 13 cooperating with the guide to fasten the implement to a work-bench or other stationary support shown at 14.

The body has a head 15 provided with a screw-threaded opening for the application of a screw 16, which at one end has a crank 17 for its manual rotation.

The guide 12 is of substantially T-shaped section for the slidable support of a block 18 which embraces the flanges 12a of the same.

The screw is connected with the block by a ball-and-socket joint 19.

The block functions as a carrier for the hose and has at an end of a slightly curved hose seat 20a a nose 20 to engage the bight-member 6 of the hose-clamp, as shown, and below the seat is a curved stop 21 to engage the hose with the clamp in place when it is turned around and across the nose.

The body 10 of the clamp has two ears 22 projecting upwardly from its head between which is rotatably supported, an eccentric clamp 23. The periphery of this clamp is preferably toothed or otherwise roughened. The clamp 23 is mounted between the ears 22 by means of a pin 24 which at one end carries a crank 25 for manual rotation of the clamp.

In the use of the implement, the eccentric clamp 23 cooperates with the surface of the head between the ears 22 to rigidly secure the leg-members 7 of the hose clamp.

The modification illustrated in Figure 4 of the drawing, differs from that hereinbefore described, in that the body of the implement is formed to provide a handle 26. In using a device of the modified construction, it is held in the hand of the user instead of being fastened to a work bench or other support.

In the operation of the invention, the hose clamp applied around a hose-section, is placed upon the seat 20a of the block 18 with its bight-member 6 engaging the nose 20 of the block, and with its leg-members rigidly secured to the body of the implement by the eccentric clamp 23. The block is moved along the guide away from the head 15 by manual rotation of the screw 16, thereby tightening the loops 5 of the hose clamp around the hose, which usually is provided with a rigid core cooperative with the clamp. After the loops of the hose clamp have been tightened, the hose is manually turned around the nose of the block and onto the stop 21 of the same, to the position shown in broken lines in Figure 1.

This movement of the hose causes the leg-members to twist around the bight-member of the hose clamp to secure the clamp in its tightened condition. After the hose is removed from the implement, the superfluous end-portions of the leg-members are severed and the twists may be tightened around the bight by means of a pair of pinchers or other suitable tool.

The nose 20 of the block may be bifurcated, as shown in Figure 2, and the eccentric clamp is of sufficient width to secure three or more leg-members, should the hose-clamp be formed in this manner.

During the operation, as above described, the implement is either secured to a stationary support, as in Figure 1, or it is held in the hand of the user as in Figure 4.

What I claim and desire to secure by Letters Patent is:

1. An implement for tightening a hose clamp having coils and a bight-member and leg-members at opposite sides thereof, comprising a body having a guide-way, a block slidable on the guide-way, having a nose to engage the bight-member and having above said nose, a seat for the support of the hose, and below the same, a stop to engage the hose when turned manually from its seat, around the nose, in a revolving motion, a clamp on the body to hold the leg-members of a hose clamp on a hose resting on the seat, and means on the body for moving the block along the guide-way.

2. An implement for tightening a hose clamp having coils and a bight-member and leg-members at opposite sides thereof, comprising a body having a guide-way, a block slidable on the guide-way, having a nose to engage the bight-member and having above said nose, a curved seat for the support of the hose, and below the same, a stop to engage the hose when turned manually from its seat, around the nose, in a revolving motion, a clamp on the body to hold the leg-members of a hose clamp on a hose resting on the seat, and means on the body for moving the block along the guide-way.

HERMAN A. FLADER.